United States Patent
Gong et al.

(10) Patent No.: US 7,873,394 B2
(45) Date of Patent: Jan. 18, 2011

(54) SELF CONTAINED KEYPAD ASSEMBLY

(75) Inventors: Frank Gong, Syosset, NY (US); Curt D. Croley, Stony Brook, NY (US); Joseph Garcia, Jr., Levittown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 973 days.

(21) Appl. No.: 10/829,066

(22) Filed: Apr. 21, 2004

(65) Prior Publication Data

US 2005/0237229 A1 Oct. 27, 2005

(51) Int. Cl.
*H04M 1/00* (2006.01)
*H04B 1/38* (2006.01)

(52) U.S. Cl. ............... 455/575.1; 455/550.1; 455/90.3
(58) Field of Classification Search ............ 455/550.1, 455/575.1
See application file for complete search history.

(56) References Cited

U.S. PATENT DOCUMENTS

| | | | |
|---|---|---|---|
| 5,166,868 A * | 11/1992 | Stanton et al. ............... | 361/814 |
| 5,280,146 A | 1/1994 | Inagaki et al. | |
| 5,517,683 A * | 5/1996 | Collett et al. ............. | 455/575.1 |
| 5,537,673 A * | 7/1996 | Nagashima et al. .......... | 455/346 |
| 5,555,550 A * | 9/1996 | Kaschke ...................... | 455/566 |
| 5,841,857 A * | 11/1998 | Zoiss et al. ............ | 379/433.04 |
| 6,115,616 A * | 9/2000 | Halperin et al. ............. | 455/557 |
| 6,703,963 B2 * | 3/2004 | Higginson .................. | 341/176 |
| 6,714,802 B1 * | 3/2004 | Barvesten ................ | 455/575.1 |
| 6,785,395 B1 * | 8/2004 | Arneson et al. ............. | 381/334 |
| 6,950,680 B2 * | 9/2005 | Kela et al. .................... | 455/566 |
| 7,042,334 B2 * | 5/2006 | Mosgrove et al. .......... | 340/5.73 |
| 2004/0110529 A1 * | 6/2004 | Watanabe et al. ........ | 455/550.1 |
| 2004/0217939 A1 * | 11/2004 | Levy et al. .................. | 345/156 |

FOREIGN PATENT DOCUMENTS

DE 4424497 A1 1/1996

OTHER PUBLICATIONS

CN OA dated Feb. 6, 2009 for CN Application Serial No. 200510068569.2, 11 pages.
First Office Action for Chinese Application Serial No. 200510068592 mailed Feb. 6, 2009, a foreign counterpart of U.S. Appl. No. 10/829,066.
Applicant's English translation of First Office Action for Chinese Application Serial No. 200510068592 mailed Feb. 6, 2009, a foreign counterpart of U.S. Appl. No. 10/829,066.
Second Office Action dated Nov. 20, 2009 for Chinese Application Serial No. 200510068592, a foreign counterpart of U.S. Appl. No. 10/829,066.
English translation of Second Office Action dated Nov. 20, 2009 for Chinese Application Serial No. 200510068592, a foreign counterpart of U.S. Appl. No. 10/829,066.

* cited by examiner

Primary Examiner—Ajit Patel

(57) ABSTRACT

Systems and methodologies are provided for fabrication of a self contained key pad module having a top cover and a bottom cover. The top cover and the bottom cover encapsulate and/or sandwich a stack of keypad components via an over mold procedure that is performed around the stack. The packed stack between the top cover and the bottom cover can include a flex member, an electro luminous panel, and a silicone membrane with a plurality of keys thereupon.

21 Claims, 9 Drawing Sheets

SELF CONTAINED KEYPAD ASSEMBLY

TECHNICAL FIELD

The present invention relates generally to key pad assemblies, and more particularly to systems and methods that provide for a top cover and bottom cover being over molded around an entire common boundary therebeween, to encapsulate various key pad components.

BACKGROUND OF THE INVENTION

Typically there is a desire to reduce size of electronic units, while lowering associated assembly costs and improving overall ruggedness. In particular, many electronic units such as hand hold mobile terminals, communication units, and the like have various assembly costs, and are generally susceptible to damage during employment in harsh environments. Such units are generally assembled by enclosing internal electrical components, such as key pads, a central processing unit (CPU) board, display, and internal wiring, within a housing made of plastic or another structural material.

In general, the key pad for such electronic apparatus is comprised of a circuit board, a frame, and a set of key switches respectively mounted in respective holes on the frame. When a key switch is clicked, a respective contact at the circuit board is triggered that causes the circuit board to output a corresponding electrical signal. Because the key switches consist of a number of parts, and are respectively placed in their respective position on the frame, gaps can exist in the common boundaries through which external environmental contaminants (e.g., water) can pass to the inside of the key pad assembly, and adversely affect its functionality.

In addition, in fabrication of such key pad assembly there are costs associated with various mechanical overheads for holding a plurality of key pad components in place. Moreover, a typical assembly of such key pad components into a compartment that houses the electronic unit can require several manufacturing processes. For example, before a housing for the electronic unit is fastened together, the key pad and other components must be assembled to a sub frame, to the housing, or to some other subassembly. Such assembly steps are generally time consuming and expensive in manufacturing.

At the same time, for many electronic units with keypads there are applications wherein associated printed circuit board and electronic components of the key pad can be exposed to high shock conditions and accelerations during deployment. In particular, with an increasing number of electronic circuitry in the form of printed circuit boards, the need has commensurately increased to ensure that associated electronic components of a key pad, as well as the electrical interconnections and the substrate on which the electrical interconnections are printed, are securely mounted on the host unit, while at the same time being easily replaceable should a need arise.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods of supplying a self contained key pad assembly that is over molded around a boundary defined by and/or common to a top cover and a bottom cover, wherein the top cover and the bottom cover encapsulate a plurality of key pad components packed together. Such over molding around the pack of keypad components can create a protective seal against outside contaminants and mitigate damage thereto. Moreover, the encapsulating arrangement of the present invention can reduce costs and mechanical overheads associated with holding the various key pad components in place.

According to one aspect of the present invention, a replaceable keypad unit is provided with a top cover and a bottom cover such that the top cover and the bottom cover encapsulate and/or sandwich a stack of keypad components. The top cover and bottom cover can define and/or connect along a boundary (e.g. a common perimeter, common surface, contact area, edge(s) of the stack, and the like) that is subsequently over molded to create a sealed key pad assembly unit. The packed stack between the top cover and the bottom cover can include a printed circuit board with flex member, an electro luminous panel, and a silicone membrane with a plurality of keys thereupon. The top cover can include a plurality of orifices wherein the keys poke there through. Such stand alone key pad assembly unit, when incorporated into an electronic device can facilitate field operation (e.g., provide ease of replacement for the keypad unit, mitigate environmental contamination, and the like.) In addition, the stand alone key pad manufactured by over molding a top cover and a bottom cover is typically sized smaller than prior art modules, and provides for a configuration that reduces its damage susceptibility during application in harsh environments.

Such stand alone key pad unit can also facilitate modular fabrication, as it can be readily mounted on a host unit after assembling the host unit. The outer side of the keypad's bottom cover (the side facing the host unit) can include additional bonding posts and pins as to improve bonds formed between the self contained key pad assembly and the host unit. Such side can further comprise interconnect pins and electrical connections employed for subsequent wire bonding and coupling of the stand alone keypad to the host electronic device.

In a related aspect of the present invention, the flex member, which can be an extension of a flexible printed circuit board, provides an electrical connection between the self contained key pad unit and the host device. Moreover, the flex member can over hang from the bottom cover, and can further employ an adhesive to connect thereto. The flex member can include exposed contacts to mate with host terminals. Such flex member can protrude out a trough of the over molded key pad. A wide flex radius provided on the flex member can allow for a range of flexural bending and twisting along the edges of the keypad compartment without breakage of the flex member. As such, the flex member can be aligned and accepted with improved connectivity for subsequent attachment via openings in a circuit board or other components adapted for receiving the keypad. This further mitigates rupture of flex components during assembly operation. In addition, a key pad fabricated with such flexes facilitates any required sealing and provides improved electrostatic discharge protection for the electronic device. Also, because of the over molding of the present invention, virtually the entire body of the self contained key pad can be plastic, wherein the individual power pins and interconnects can be located in close proximity, since plastic of the over mold can provide a higher dielectric insulation as compared to the more conventional use of air as a dielectric insulator.

According to a further aspect of the present invention, a piezo electric speaker can be connected to the bottom cover. Such piezo electric component can vibrate the bottom cover, and transmit the sound through the stack of key pad components to the user.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

Figure 1A:
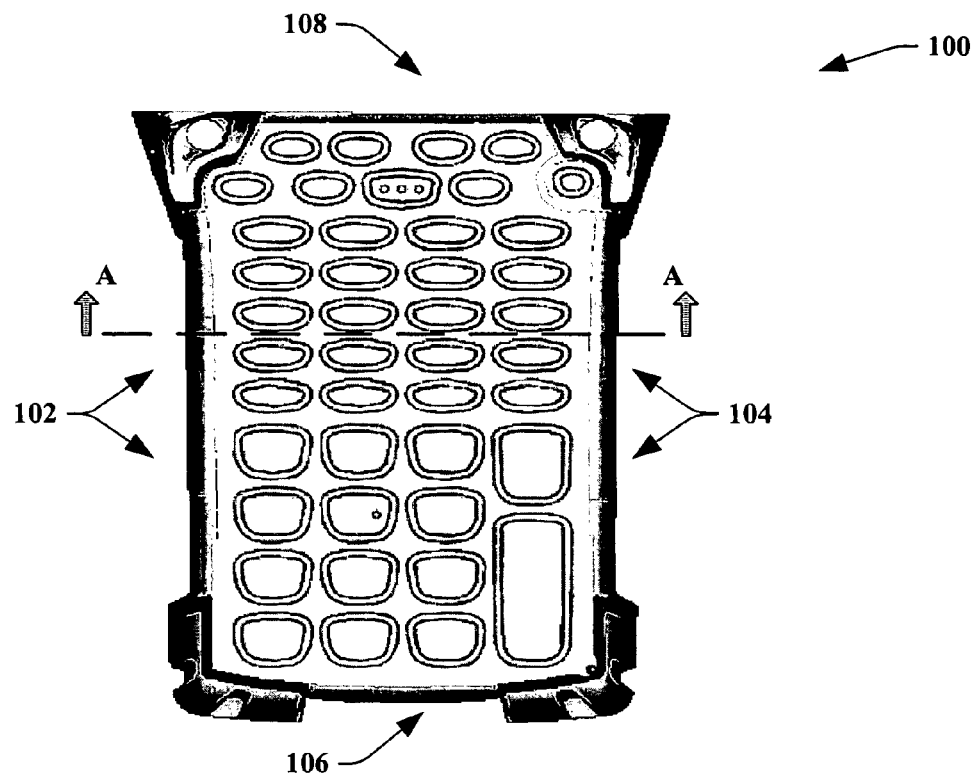
FIGS. 1(a) and 1(b) illustrate a plan view and a schematic side view cut of a key pad wherein the top and bottom covers are inter molded along side a common boundary to create a stand alone key pad according to one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 1B:
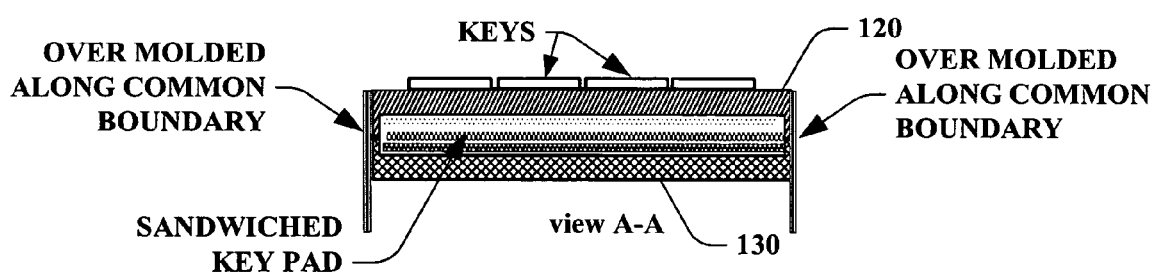

The present invention provides for systems and methods of supplying a self contained key pad assembly that mitigates mechanical over head associated with holding various key pad components, while providing for a configuration that reduces its damage susceptibility during application in harsh environments. Referring initially to FIGS. 1(a) and 1(b), a plan view and a schematic side view cut of a stand alone and sealed key pad are illustrated respectively. Such key pad 100 includes a top cover 120 and a bottom cover 130 that are being over molded around a common boundary 102, 104, 106, and 108. In one aspect of the present invention, the top cover 120 and the bottom cover 130 sandwich a plurality of associated key pad components (e.g., flex members, electro luminous panel, a silicone membrane with a plurality of keys thereupon, printed circuit boards, LEDs, and the like). The common boundary can be formed by a surface area and/or line perimeter common to the top cover and the bottom cover, (e.g. a contact surface between top and bottom cover, a surface encapsulating the key pad components, edges of the stacked components and the like.) Typically, materials employed for fabricating the top cover 120 and the bottom cover 130 can include various types of polycarbonates, thermoset plastics, thermoformed plastic, and typically material that are capable of over molding to provide a suitable bondage between the top cover 120 and the bottom cover 130. Such suitable bondage can for example be capable of supplying a sealed key pad assembly that mitigates presence of external contaminants in the device. Moreover, the top cover 120 can be fabricated with a transparent quality to provide for visual notification by illuminating a certain color or brightness on the key pad surface.

For example, if during operation a key that changes an operation mode for the unit is being pressed, then a portion of the key pad can illuminate via LED(s), as to alert a user of the selected mode of operation. By observing the illuminating color or brightness on the keypad surface, a user can readily ascertain the mode selected for the unit and prepare accordingly. In particular, when actuation of the key changes a keypad's alphanumerical designations that a user routinely applies and is accustomed to. Accordingly, a user may be dumbfounded if not alerted to such alterations in the function of the key pad. To mitigate such ambiguity, the stand alone key pad of the present invention can provide a visual notification by illuminating a certain color or brightness on the key pad surface. Moreover, various audio heralds, alone or in combination with the visual alerts can be employed for alerting a user that a particular key has been actuated.

Figure 2:
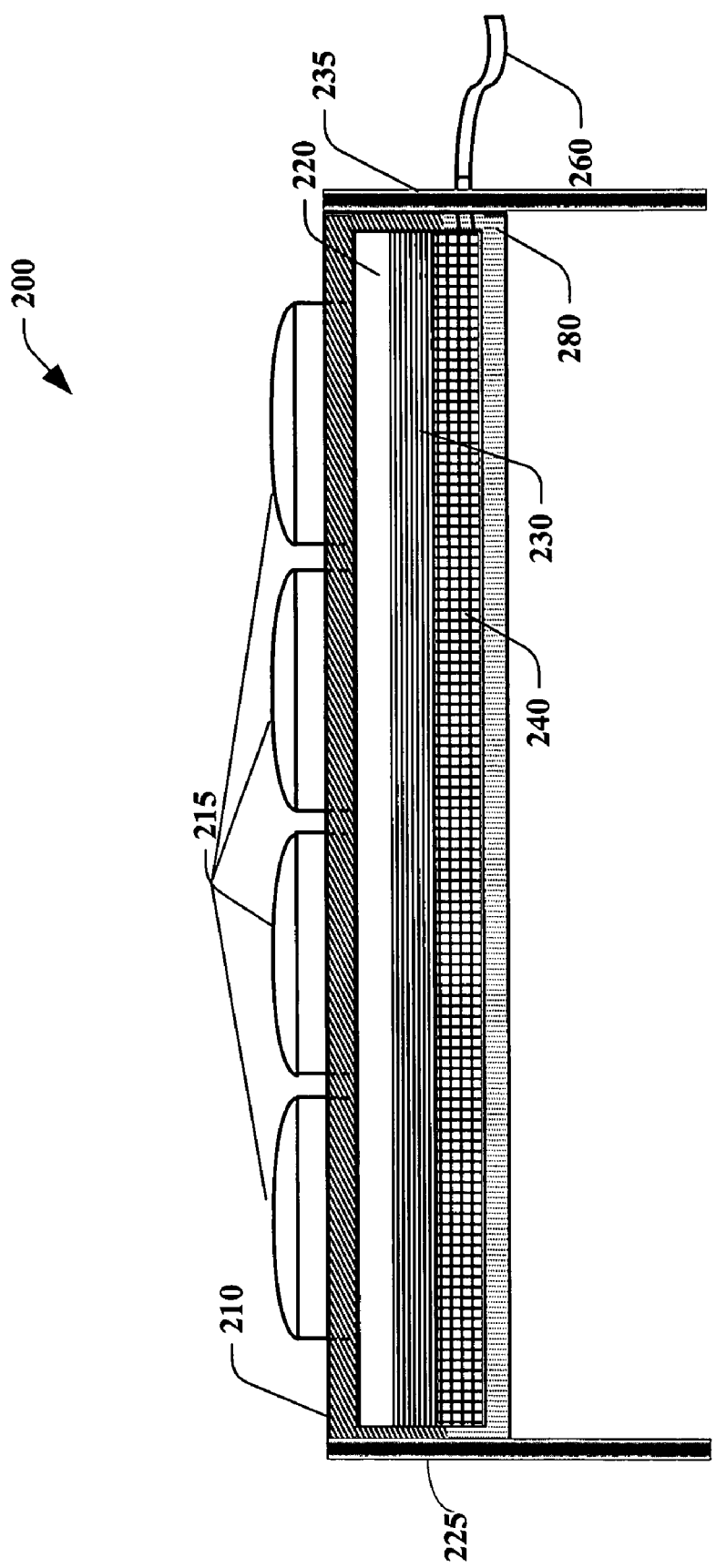
FIG. 2 illustrates an exemplary stack of keypad components employed for fabricating a stand alone over molded key pad of the present invention.

FIG. 2 illustrates an exemplary stack of keypad components employed for fabricating a stand alone over molded key pad 200 of the present invention. Such stack can be packed or sandwiched between a top cover 210 and a bottom cover 280 that are over molded alongside a common boundary (225, 235) to create a sealed key pad assembly unit 200. The packed stack can include a silicone membrane 220 placed on top of an electro luminous panel 230, which in turn overlies a printed circuit board 240 with a flex member 260 hanging over sides thereof. The silicone membrane 220 can contain the individual keys 215 positioned thereupon, which protrude out of the top cover 210 via orifices therein. Each key 215 can have a curved upper surface for optimum thumb tangency, and the individual keys are sufficiently spaced apart so as not to interfere with actuating any one key. Entering variable data via the key pad to a host unit is similar to operating a calculator.

In addition dome shaped switch projections (not shown) are positioned at the bottom portion of each key, and are displaced between individual keys and the printed circuit board 240. When assembled, the contact projection of a corresponding dome switch at the bottom of each key aligns with a designated contact point (not shown) on the printed circuit board 240. When a key is pressed, its corresponding dome switch actually touches the designated contact point on the printed circuit board 240 to complete an electrical circuit, and generate an input signal. When the user releases a pressure on the key, the dome switch and key restore to their original positions. The dome switches are selected from a material having a predetermined degree of elasticity such that the dome switches can return to their original shape after the user withdraws from pressing on the keys. The electro luminous panel 230 can be a thin plastic component that can glow when a current is applied thereto, and is positioned beneath the silicone membrane 220.

As illustrated, the top cover 210 and bottom cover 280 can define a common perimeter extending around the keypad assembly, which can be subsequently over molded (225, 235) to create a sealed key pad assembly unit 200. The packed stack between the top cover 210 and the bottom cover 280 can include: a printed circuit board 240 with a flex member 260 that can be an extension thereof, an electro luminous panel 230, and a silicone membrane with a plurality of keys thereupon. The top cover 210 can include a plurality of orifices wherein the keys 215 poke there through. The printed circuit board 240 can be connected to an inner surface of the bottom plastic cover 280 via an adhesive, or can also be insert molded therein. The projecting flex member 260 can bend and attach to an outer surface (facing the host unit) of the bottom cover 280, to provide electrical connection to the host unit.

It will be appreciated by one skilled in the art that a variety of different wire patterns and metal strips can be selected in order to achieve the desired connections with the host device. Also, conducting metal lines on such flex member 260 can be formed by printing, etching, or any other suitable method.

Figure 3A:
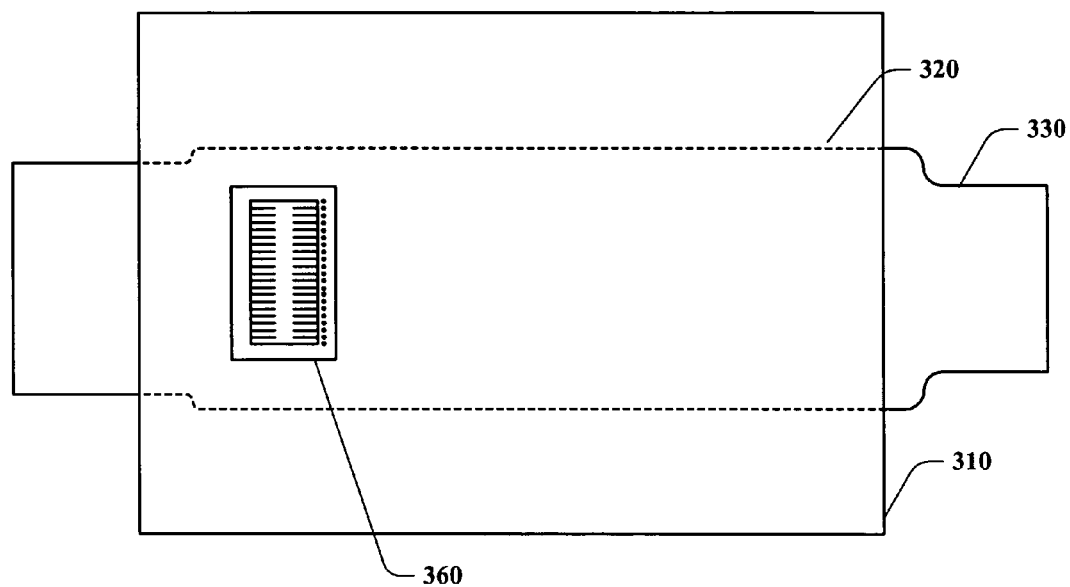
FIGS. 3a and 3b illustrate a plan and side view of the printed circuit board and an overhanging flex member connected to the bottom cover according to an aspect of the present invention.
Figure 3B:
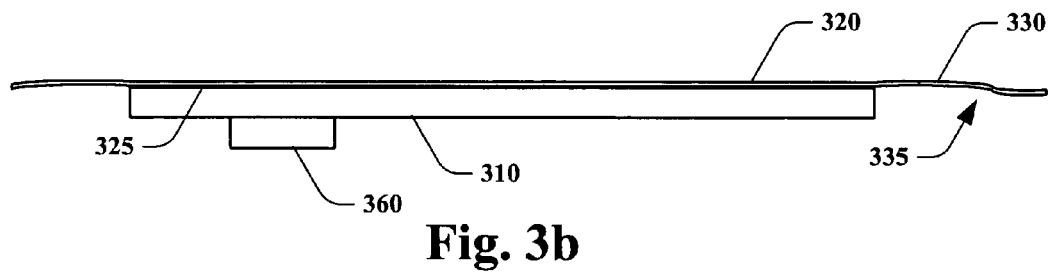

FIGS. 3a and 3b illustrate a plan and side view of bottom cover 310 with a flex member 330 hanging as an extension of the printed circuit board 320 in accordance with an aspect of the present invention. The flex member 330 can be a thin film of conductors and/or plastic employed for interconnect procedures. The printed circuit board 320 can be bonded to an inner surface of the bottom plastic cover 310 at 325, wherein the flex member 330 protrudes out of a trough (not shown) of an already fabricated key pad assembly to facilitate inter connect procedures with a host unit. Alternatively, in one aspect according to the present invention the bottom plastic cover and the flex member 330 can be molded in one stage. The flex member 330 can be fabricated from material with high deformability features, such as various plastic, rubber, and the like, having a form of a thin film warped and curved at different locations. The wide flex radius 335 provided on the flex member 330 can allow for a range of flexural bending and twisting along the edges of the bottom plastic cover 310 without breakage of the flex member 330. Accordingly, the flex member 330 can be aligned and accepted with improved connectivity for subsequent attachments to openings in a circuit board or other components of a host unit that receive the self contained key pad. This further mitigates rupture of flex components during assembly operation. In addition, a key pad fabricated with such flexes facilitates any required sealing as part of attachment of the key pad to a host unit, and provides improved electrostatic discharge protection for the host device.

The stand alone key pad of the present invention is typically sized smaller (e.g., a thickness of about 0.25") than prior art modules, and provides for a configuration that reduces damage susceptibility during application in harsh environments. The outer side of the bottom cover (the side facing the host unit) can include additional bonding posts and pins 360 as to improve bonds formed between the bottom cover and the host unit. Such side can further comprise interconnect pins and electrical connections employed for subsequent wire bonding and coupling of the stand alone keypad to the host electronic device.

Figure 4:
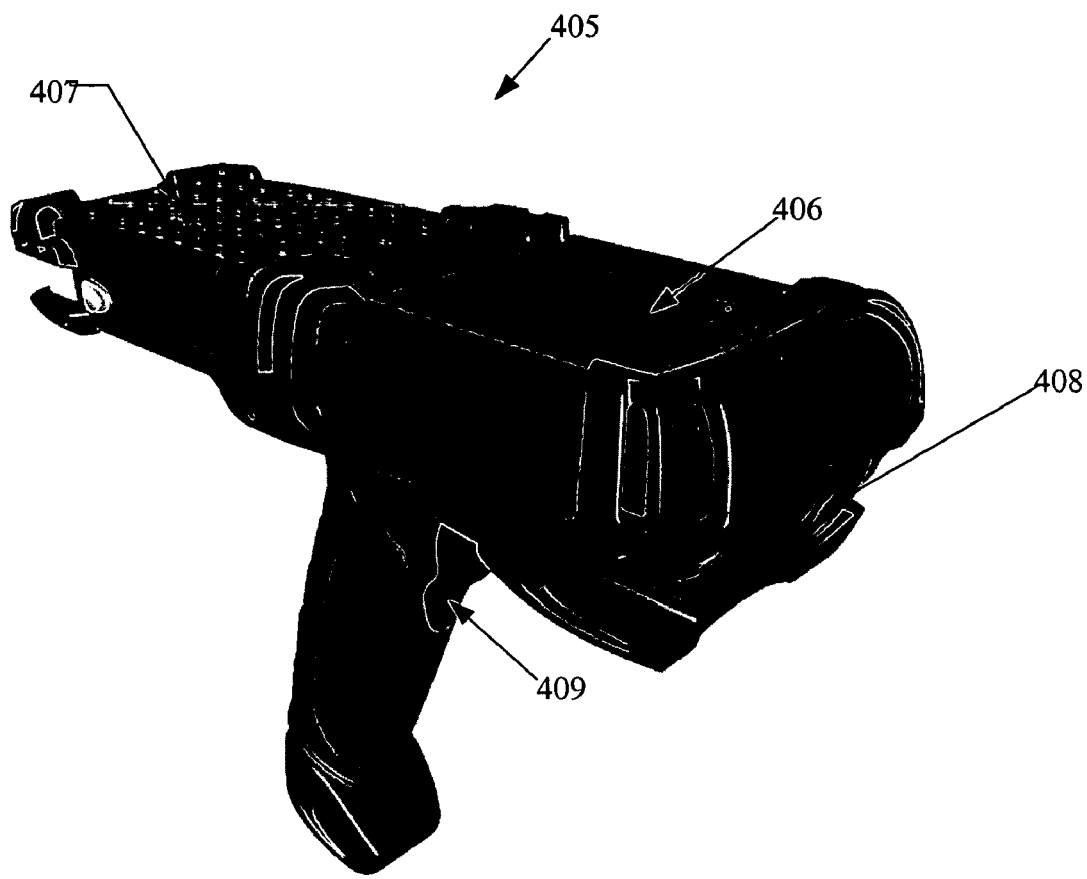
FIG. 4 illustrates a particular portable unit that can incorporate a stand alone keypad in accordance with an aspect of the present invention.

The stand alone key pad of the present invention can be employed in a variety of electrical or electronic device that can require entry of a user's input via pressing alpha, alphanumerical designations or keys thereon. Examples of such devices can include, Palm Pilots™, mobile phones, telephones, faxes, computers, mini computers, scanners, terminals, and the like. One particular device that can incorporate such key pad is illustrated in FIG. 4. Referring now to FIG. 4, an exemplary hand held scanner is illustrated that can host a self contained key pad of the present invention. The host terminal 405 includes a display 406 for displaying information. The display 406 can be a touch screen and may employ capacitive, resistive touch, infrared, surface acoustic wave, or grounded acoustic wave technology. Furthermore, the display 406 can be a liquid crystal device, cathode ray tube (CRT), field emission device (FED, also called flat panel CRT) or any other display device suitable for creating graphic images and alphanumeric characters recognizable to the user. The host terminal 405 further includes an over molded keypad 407, which is placed as a stand alone unit to enter information concerning modes of operation of the mobile terminal or to carry out cancellation or manipulation operations on information provided by the terminal. The keypad 407 consists of a staked group of components over molded around its edges, as described in detail supra.

As shown, the portable bar code scanner 405 is configured to be held with the palm of a user's hand, and various keys on its self contained keypad 407 can be engaged by thumb or fingers of the hand holding the housing. The user aims the window 408 at a desired indicia to be read and presses the trigger 409 that activates the reader unit. Display unit 406 can be employed to display information relating to a mode of operation of the electronic unit, or display check information relating to an item being read by an optical scanner (not shown) located in the electronic unit. The bar code scanner 405 can be employed in a wireless communication network for tracking inventory, storing data, etc. Typically, no cables can be required to connect the scanner apparatus to a computer device, thereby further reducing its weight and consequent fatigue, and eliminating the inefficiencies caused by entanglement with such cables. Moreover, its size allows easy access to difficult scanning locations. The scanner 405 provides rapid key entry and reading of displayed information, providing the operator with real time data so that decisions and actions can be quickly implemented. A user can input and/or process data via keypad, scanner element, etc. independent of the hand-held terminal 405 being connected to a communication network, for example a LAN or a WAN. When hand-held terminal 405 does not include a transceiver to provide for real time communications, the data can be stored in memory within the hand-held terminal 405. Accordingly, should the hand-held terminal 405 subsequently be connected to a network, stored data can be downloaded to a host computer (not shown).

Figure 5:
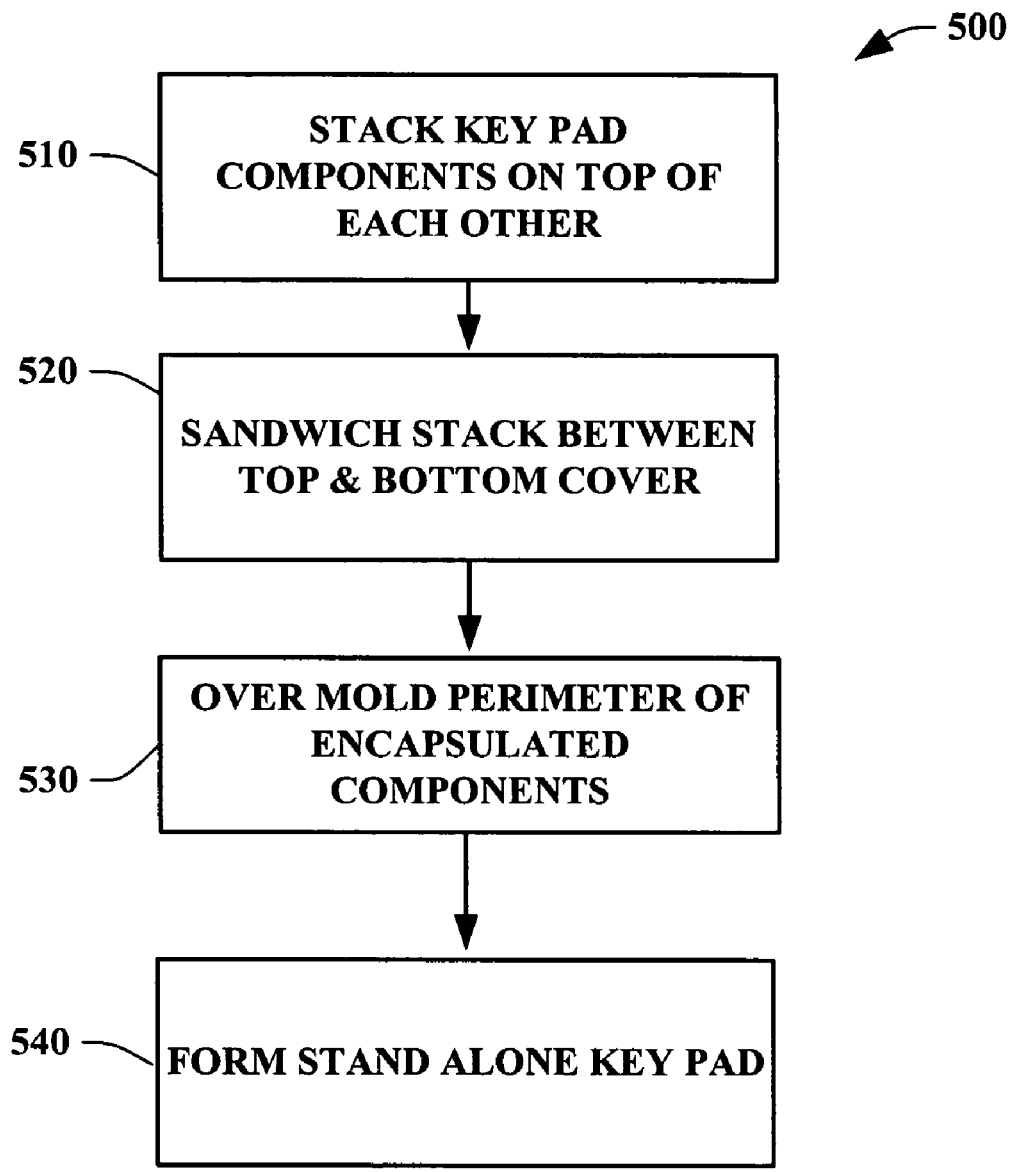
FIG. 5 illustrates an exemplary methodology according to the present invention.

FIG. 5 illustrates an exemplary methodology according to one aspect of the present invention. Initially and at 510 a plurality of key pad components are packed on top of each other to form a stack. Such packed stack can include flex members, electro luminous panel, a silicone membrane with a plurality of keys thereupon printed circuit boards, LEDs, and the like, as described in more detail supra. Subsequently, and at 520 such stack can be sandwiched between a bottom cover and a top cover. The top cover and bottom can encapsulate the stacked components, and trough(s) can be provided in such encapsulation for allowing protrusion of members such as: flex components supplying various electrical connections to a host unit, or for individual key members to poke out of orifices in the top cover. Next, and at 530 a perimeter of such encapsulation can be over molded to form a self contained key pad assembly, at 540. Such methodology for fabricating the stand alone key pad assembly can reduce costs and mechanical overheads associated with holding the various key pad components in place. In addition, the stand alone key pad assembly unit, when incorporated into an electronic device can facilitate field operation (e.g., provide ease of replacement for the keypad unit, mitigate environmental contamination, and the like.)

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention can be implemented in association with the method illustrated and described herein, as well as in association with other systems and apparatus not illustrated or described.

Figure 6:
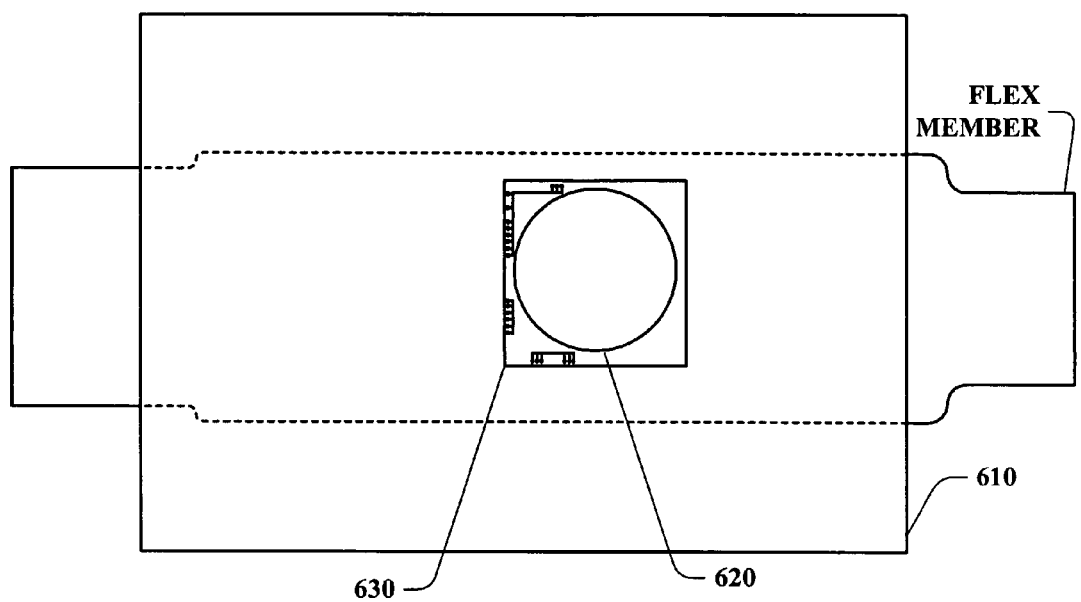
FIGS. 6(a) and 6(b) illustrate a plan view and a side view of a bottom plastic cover with a speaker therein according to one aspect of the present invention.
Figure 6B:
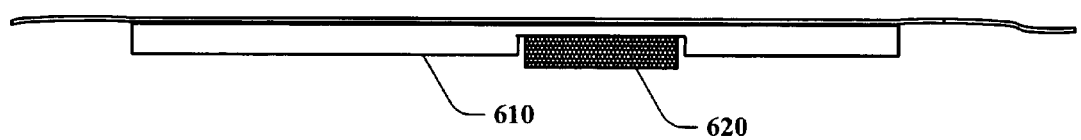

According to a further aspect of the present invention, a piezo electric speaker can be integrated into the bottom cover. Such piezo electric component can vibrate the bottom cover, and transmit the sound through the stack of components to the user. Electrical controls for the speaker, as well as the speaker it self can be located beneath and outside the stand alone key pad and associated component. This can improve design flexibility, for example by mitigating a need for a dedicated frontal area in the product that increases a size thereof. FIG. 6 illustrates such exemplary arrangement wherein the bottom plastic cover 610 is provided with a speaker 620 therein. The speaker 620 can be a conventional speaker or a piezo electric speaker, and can be positioned in a recess 630 of the bottom plastic cover 610. Various audio paths (not shown) can also be formed within the body of the stand alone key pad to provide a path way for sound generated by the speaker 620.

In a related aspect of the present invention the over molded key pad assembly of the present can facilitate a modular fabrication and assembly of host units that incorporate such stand alone key pad. For example, such an arrangement can provide an initial fabrication of the host unit followed by a subsequent attachment of a specific key pad configuration that has been over molded according to the present invention. Accordingly, after manufacturing services and warranty services can be simplified, for example by replacing the damaged keypads as a separate stand alone component.

Figure 7:
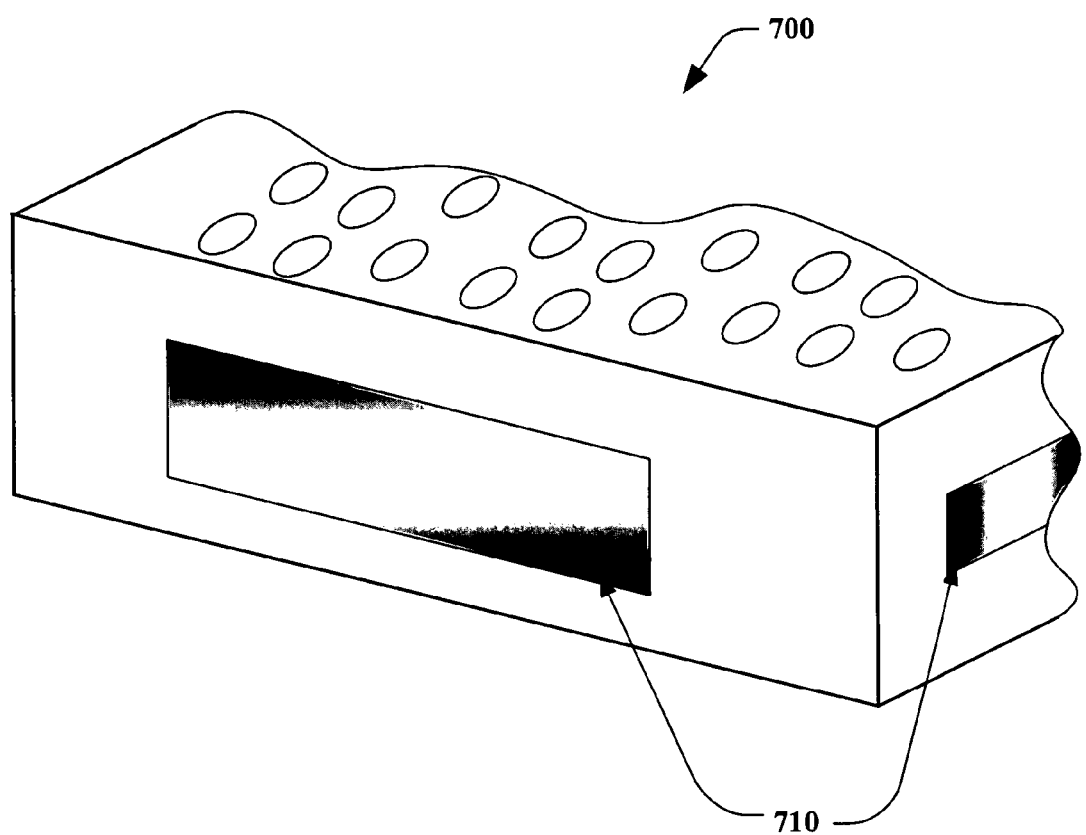
FIG. 7 illustrates an exemplary broken perspective of a stand alone key pad with identification tags in accordance with an aspect of the present invention.

In a related aspect the present invention, the stand alone key pad module can contain an identification element that identifies itself to the host unit, e.g., by mounting the key pad on the host unit, automatic identification is provided thereto. The host unit can then load appropriate software for use with the key pad. Accordingly, the host unit can be configured to carry different functions simply by changing the stand alone key pad attached thereto. Such modular configuration increases a user's operation flexibility when employing a stand alone key pad of the present invention. FIG. 7 illustrates a stand alone key pad assembly of the present invention with electronic identification tags 710 located on its over molded perimeter. It is to be appreciated that such tags can be placed at various other locations of the stand alone key pad, to identify itself to the host unit.

Figure 8:
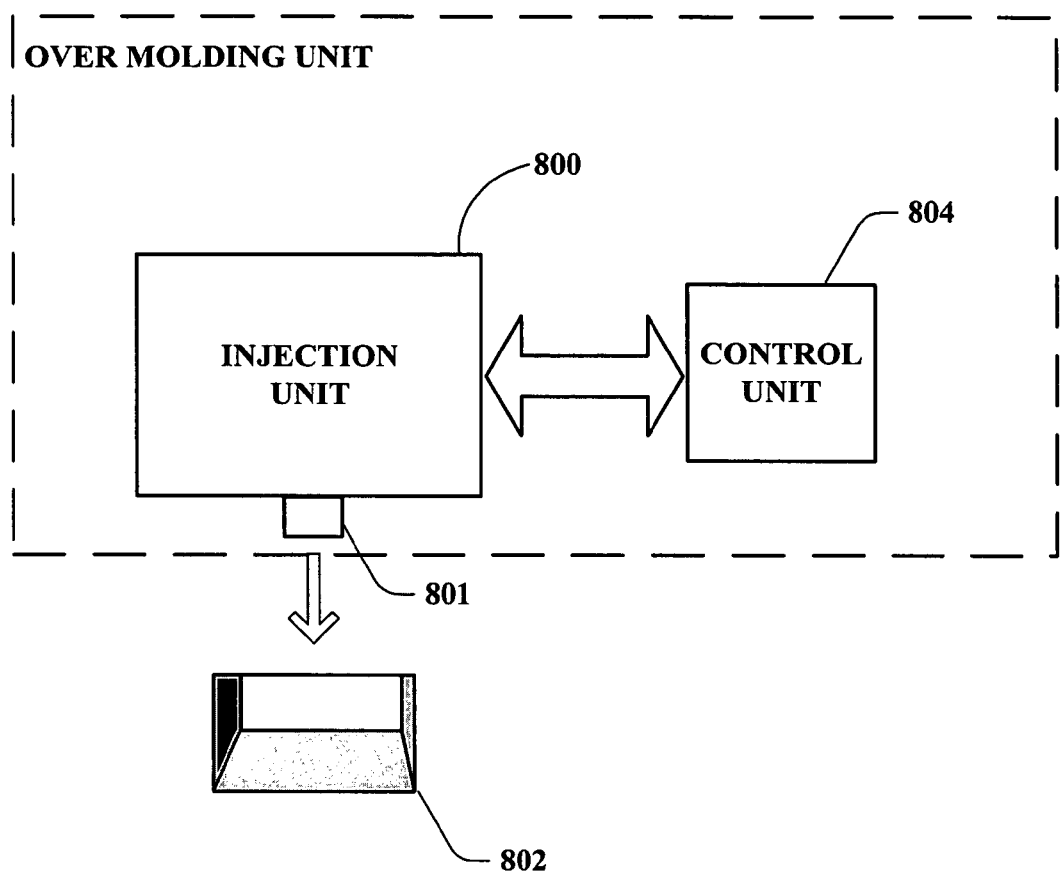
FIG. 8 illustrates a block diagram of an exemplary molding system that can over mold a top cover and bottom cover to form a stand alone key pad according to the present invention.

Referring now to FIG. 8, a schematic diagram depicts a system for over molding a perimeter of a top plastic cover and a bottom plastic cover with key pad components encapsulated and/or sandwiched therein, according to one aspect of the present invention. Initially, the injection unit 800 melts the polymer resin and injects the polymer melt into the molding space 802 that can hold the key pad components in preparation for over molding. The employed resin can comprise various types of thermoset plastic or thermo plastic material such as polybutylene terephthalate, polyethylene terephthalate, polyphenylene sulfide, diallyl phthalate, phenolic resins, and the like. The resin material can be injected on to desired locations (e.g. around a common perimeter of the top and bottom cover) via a rate sufficient to maintain an unbroken melt front, and to avoid any spraying or splashing of the plastic material within the mold cavity. In addition, the injection pressure and temperature can be regulated via a control unit 804, to moderate susceptibility of damage to the over molded key pad component.

The unit 800 may be ram fed or screw fed. The ram fed injection molding machine typically can employ a hydraulically operated plunger to push the plastic through a heated region. The high viscosity melt is then spread into a thin layer by a "torpedo" to allow for better contact with the heated surfaces. The melt converges at a nozzle 801 and is injected into the mold space 802, which can hold the key pad components in preparation for over molding. The reciprocation screw injection molding machine employs a screw that rotates and axially reciprocates. Rotation is produced by a hydraulic motor and acts to melt, mix, and pump the polymer resin. A hydraulic system controls the axial reciprocation of the screw, allowing it to act like a plunger, moving the melt forward for injection. A valve prevents back flow of the melt from the mold cavity.

Next, the polymer flows from the nozzle 801 to the molding space 802, which can be coupled to the nozzle 801 by a sprue bushing (not shown). Typically, the injection mold 802 can include two mold halves that define a space for accepting the keypad components and over molding around its stack of components. Before injecting plastic material into the mold space 802, the mold space can be heated to a temperature above the melting point of the plastic material by circulating a heat carrier flowing through a heating device. During injection of plastic material, the flow of heat carrier can be stopped for maintaining the temperature of the mold. Molten resin can be injected into the cavity 802 via a rate sufficient to maintain an unbroken melt front and to avoid any spraying or splashing of the plastic material within the mold cavity. The injection process requirements can be regulated via a control unit 804 that includes a CPU. The control unit 804 can control and monitor, for example, the injection pressure until the over molding around the top cover and the bottom cover of the key pad has been completed, at which time the injection pressure is maintained until the plastic material has hardened around the common perimeter between the top and bottom cover of such stand alone key pad unit.

After completely over molding a common perimeter between the top cover and the bottom cover, the mold 802 is cooled down. The over-molded key pad component can be held in place via employment of a clamp assembly associated with the mold 802. The over molding process can be controlled throughout, so that the over molded top cover and the bottom cover, as well as the stacked key pad components are not dislocated or damaged.

In a mold space 802 having multiple cavities, the melt flows to each cavity by runners and is fed to the cavity through a gate (not shown). The gate can simply act as a restriction in the flow path just ahead of the mold cavity, and serves to direct the flow of the melt into the cavity and to limit back flow. The gate can comprise a plurality of gate orifices located near the edges of the mold cavity. These orifices can be located as to allow forwarding resin material into the mold cavity in roughly equal volumes on all free sides of the key pad component being over molded as a stand alone sealed unit.

In addition, resin injection can be performed via gas assisted injection and non-gas assisted injection. Gas assisted injected mold processing generally comprises two steps. First, viscous thermoplastic is injected through runner conduits and gate conduits into mold cavities. Shortly thereafter gas is injected through the runners and gates to force the thermoplastic against the walls of the mold cavities to form the desired articles. In the case of non gas-assisted injection molding, there is no gas injection step.

Figure 9:
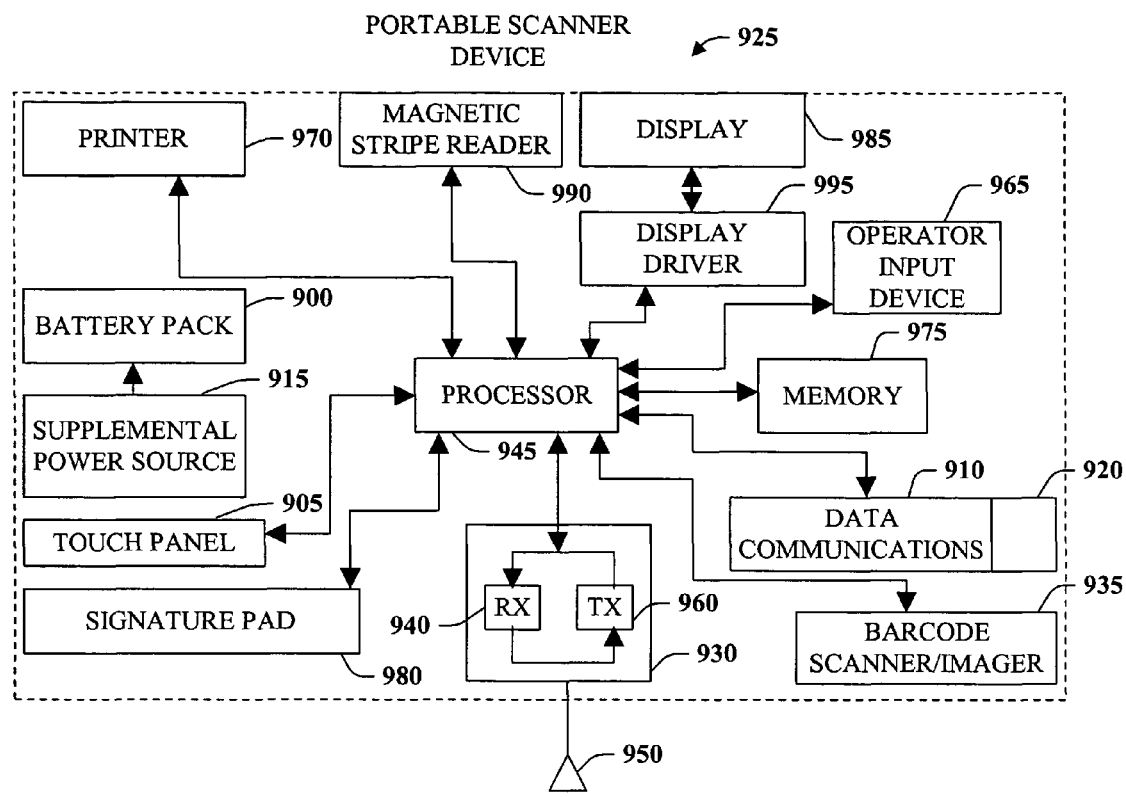
FIG. 9 illustrates a schematic block diagram for a particular host unit that can employ the stand alone keypad of the present invention.

As explained earlier, the stand alone key pad of the present invention can be employed in a variety of electrical or electronic device that can require entry of a user's input via pressing alpha, alphanumerical designations or keys thereon. FIG. 9 illustrates a schematic block diagram for a host portable scanner unit 925 that employs a self contained keypad as described supra. As illustrated, a processor 945 is responsible for controlling the general operation of a portable scanner device 925 that employs a self contained key pad as discussed supra. The processor 945 is programmed to control and operate the various components within the scanner device 925 in order to carry out the various functions described herein. The processor or CPU 945 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can also be employed. The manner the processor 945 can be programmed to carry out the functions relating to the present invention will be readily apparent to those having ordinary skill in the art based on the description provided herein. A memory 975 tied to the processor 945 is also included in the portable scanner device 925 and serves to store program code executed by the processor 945 for carrying out operating functions of the scanner. The memory 975 also serves as a storage medium for temporarily storing information such as receipt transaction information and the like. The memory 975 is adapted to store a complete set of the information to be displayed. According to one particular aspect, the memory 975 has sufficient capacity to store multiple sets of information, and the processor 945 could include a program for alternating or cycling between various sets of display information.

Display(s) 985, which as described earlier can be mounted on a side of the terminal housing is coupled to the processor 945 via a display driver system 995. The display 985 is operable to display data or other information relating to ordinary operation of the portable scanner 925. For example, the display 985 may display a set of customer information, which is displayed to the operator and may be transmitted over a system backbone (not shown). Additionally, the display 985 may display a variety of functions that control the execution of the portable electronic device 925. The display 985 is capable of displaying both alphanumeric and graphical characters. Furthermore, as explained earlier the display 985 may be a touch screen that is capable of receiving user information as well as displaying information.

Power is provided to the processor 945 and other components forming the portable electronic device 925 by a battery pack 900, which is located in the top housing. In the event that the battery pack 900 fails or becomes disconnected from the portable electronic device 925, a supplemental power source 915 provides power to the processor 945, the supplemental power source 915 being a super capacitor connected electrically in parallel with the battery 900. The hand-held terminal 925 may enter a minimum current draw of sleep mode upon detection of a battery failure.

The portable electronic device 925 includes a communication subsystem 930 that includes a data communication port employed to interface the processor 945 with the main computer. The portable electronic device 925 also optionally includes an RF section 930 connected to the processor 945. The RF section 930 includes an RF receiver 940, which receives RF transmissions from the main computer for example via an antenna 950 and demodulates the signal to obtain digital information modulated therein. The RF section 930 also includes an RF transmitter 960 for transmitting information to the main computer, for example, in response to an operator input, e.g. via a self contained keypad of the present invention, or the completion of a transaction. Peripheral devices, such as a printer 970, signature pad 980, magnetic stripe reader 990, touch panel 905, can also be coupled to the portable scanner device 925 through the processor 945.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A key pad assembly comprising:
a top cover placed over a stack of keypad components;
a bottom cover placed under the stack; the top cover and the bottom cover defining a common perimeter; and
an over molded portion that extends around the perimeter to form a self contained key pad unit.

2. The key pad assembly of claim 1, the top cover and the bottom cover sandwich the stack.

3. The key pad assembly of claim 1, the top cover and the bottom cover are over molded to create a sealed common boundary.

4. The key pad assembly of claim 1, the stack comprises a printed circuit board with a flex member, an electro luminous panel, a silicone membrane with a plurality of keys, placed on top of each other.

5. The key pad assembly of claim 3, the flex member provides an electrical connection between the self contained key pad unit and a device that hosts the self contained key pad unit.

6. The key pad assembly of claim 5, the flex member protrudes out a trough of the self contained key pad unit.

7. The key pad assembly of claim 1, the bottom cover with a recess that houses a speaker therein.

8. The key pad assembly of claim 1, the top cover and bottom cover fabricated from at least one of polycarbonates, thermoset plastics, or thermoformed plastic.

9. The key pad assembly of claim 1, an illumination color or a brightness on a surface of the keypad indicates a mode of the key pad.

10. A method of fabricating a self contained key pad comprising:
sandwiching a plurality of key pad components between a top cover and a bottom cover, the top cover and bottom cover defining a common perimeter; and
inserting molding around the perimeter for encapsulating the top cover and the bottom cover.

11. The method of claim 10 further comprising sandwiching the key pad components between the top and bottom cover.

12. The method of claim 10 further comprising housing a speaker in a recess of the bottom cover.

13. The method of claim 10 further comprising providing electrical connections to a host unit via a flex member.

14. A self contained key pad comprising:
a stack comprising:
a membrane with a plurality of keys placed thereupon,
a printed circuit board positioned beneath the membrane;
a top cover placed over the stack; and
a bottom cover placed under the stack, the top cover and the bottom cover define a common boundary around the stack, the common boundary over molded to encapsulate the stack between the bottom cover and the top cover.

15. The self contained key pad of claim 14, the common boundary includes a contact surface of the top and bottom cover.

16. The self contained key pad of claim 14, the common boundary includes a perimeter common to the top and bottom cover.

17. The self contained key pad of claim 16, the bottom cover connected to a piezo electric speaker.

18. The self contained key pad of claim 16, the bottom cover contacts the printed circuit board.

19. The self contained key pad of claim 16, the top cover and the bottom cover sandwich the stack.

20. The key pad assembly of claim 1 further comprising an identification component that automatically identifies the key pad to a device that hosts the self contained key pad assembly.

21. The self contained key pad of claim 14 further comprising an identification component that automatically identifies the self contained key pad to a device that hosts the self contained key pad.

* * * * *